United States Patent
Jantz et al.

(10) Patent No.: US 6,487,677 B1
(45) Date of Patent: Nov. 26, 2002

(54) METHODS AND SYSTEMS FOR DYNAMIC SELECTION OF ERROR RECOVERY PROCEDURES IN A MANAGED DEVICE

(75) Inventors: Ray M. Jantz, Wichita, KS (US); Matthew A. Markus, San Francisco, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/410,187

(22) Filed: Sep. 30, 1999

(51) Int. Cl.$^7$ .............................................. G06F 11/00
(52) U.S. Cl. ............................................ 714/2; 714/48
(58) Field of Search ................................ 714/2, 3, 4, 8, 714/25, 27, 32, 39, 41, 48, 49, 5, 6, 13, 15

(56) References Cited

U.S. PATENT DOCUMENTS

| | | | | |
|---|---|---|---|---|
| 3,668,631 A | * | 6/1972 | Griffith et al. ............ 340/146.1 |
| 4,837,675 A | * | 6/1989 | Bean et al. ................. 364/200 |
| 4,945,474 A | * | 7/1990 | Elliot et al. ................. 364/200 |
| 5,023,873 A | * | 6/1991 | Stevenson et al. ........... 371/8.2 |
| 5,237,677 A | * | 8/1993 | Hirosawa et al. ........... 395/575 |
| 5,287,363 A | | 2/1994 | Wolf et al. ................ 371/21.1 |
| 5,371,882 A | | 12/1994 | Ludlam ...................... 395/575 |
| 5,379,162 A | * | 1/1995 | Cunningham et al. ........ 360/53 |
| 5,406,502 A | | 4/1995 | Haramaty et al. ..... 364/551.01 |
| 5,448,681 A | | 9/1995 | Khan .......................... 395/11 |
| 5,500,940 A | | 3/1996 | Skeie .................... 395/183.01 |
| 5,521,842 A | * | 5/1996 | Yamada .................. 364/514 B |
| 5,586,250 A | | 12/1996 | Carbonneau et al. .... 395/183.2 |
| 5,602,761 A | | 2/1997 | Spoerre et al. ............. 364/554 |
| 5,619,644 A | | 4/1997 | Crockett et al. ....... 395/183.21 |
| 5,717,850 A | | 2/1998 | Apperley et al. ...... 395/182.04 |
| 5,815,651 A | * | 9/1998 | Litt ........................ 395/182.08 |
| 6,317,850 B1 | * | 11/2001 | Rothberg .................... 714/704 |

\* cited by examiner

*Primary Examiner*—Nadeem Iqbal
(74) *Attorney, Agent, or Firm*—Suiter & Associates, PC

(57) ABSTRACT

Methods and associated systems using probabilistic methods for selecting among a plurality of diagnostic procedures to recover from an error condition in a managed device. Operation of a managed device is overseen by a management device. A management client process operable within the management device communicates with a management service operable within the managed device. Upon detection of an error condition within the managed device, the management service propagates an event to the management client so indicating an error condition. The management client in the management device responds to the event by requesting the managed device to determine the best options for recovery procedures. The managed device then computes a probability of success for each known recovery procedure based upon the present state of the managed device and based upon past successes or failures of recovery procedures for particular error conditions. A list of each recovery procedure and its associated probability is returned to the management device. A user or client process then selects a desired procedure to attempt to correct the error condition in cooperation with the managed device. The process then repeats, recomputing the probability values for each recovery procedures, as needed until the problem is successfully resolved by a selected recovery procedure.

20 Claims, 3 Drawing Sheets

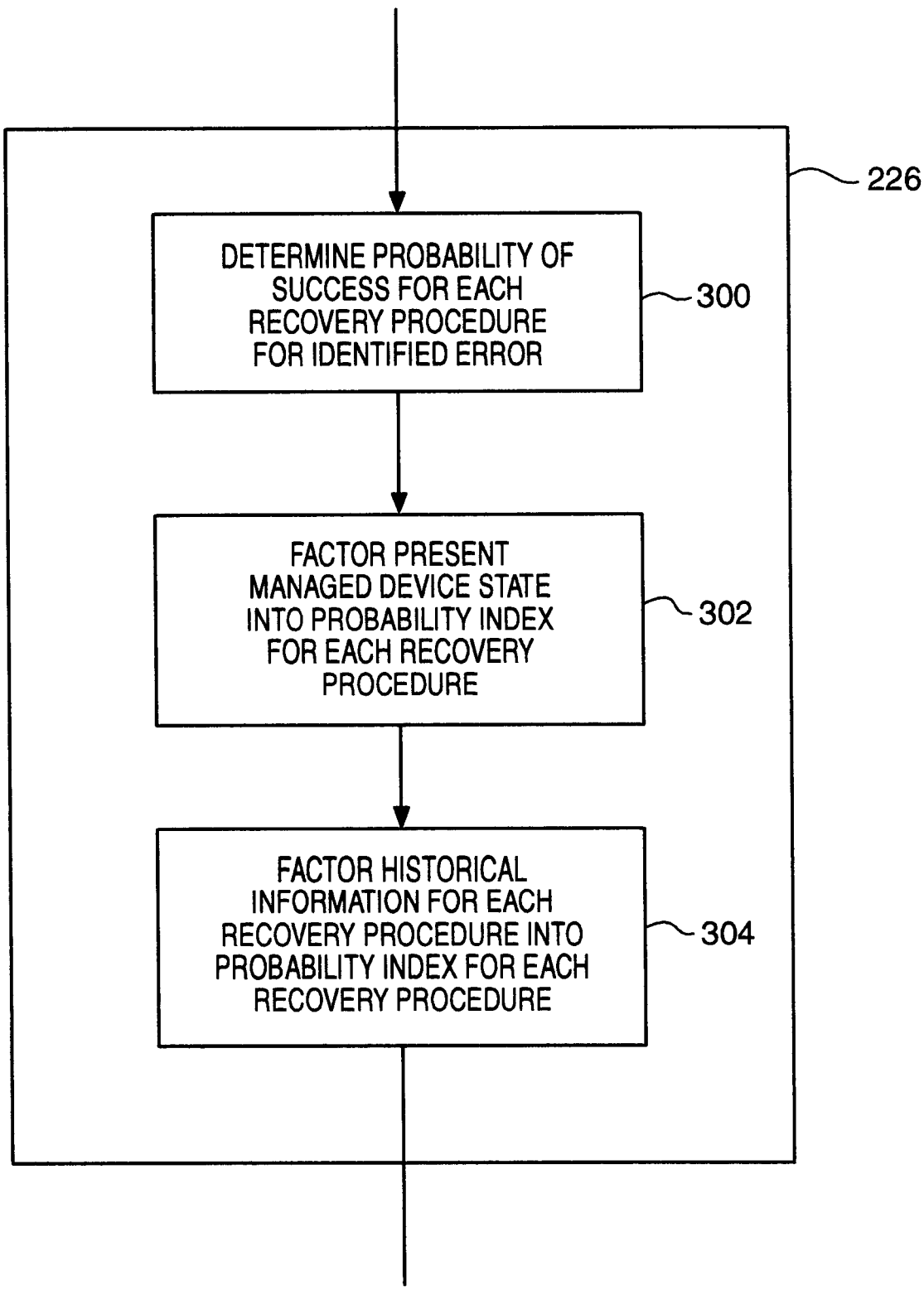

METHODS AND SYSTEMS FOR DYNAMIC SELECTION OF ERROR RECOVERY PROCEDURES IN A MANAGED DEVICE

BACKGROUND OF THE INVENTION

1. Field of the Invention

The invention relates generally to error recovery procedures in managed devices and more specifically relates to automated methods and systems to apply probabilistic calculations to dynamically select error recovery and diagnostic procedures for resolving error conditions in a managed device.

2. Description of Related Art

As computing systems of various types have grown in complexity, so to has grown the complexity of diagnosing problems with such complex computing systems. Even users of home personal computer systems are familiar with the frustrations of trying to diagnose difficult problems on such relatively simple home systems. Such frustrations are magnified many fold in larger, more complex computing systems and large peripheral subsystems.

In general, diagnosing such problems entails selecting from among a plurality of diagnostic and test procedures (also referred to herein as recovery procedures) to determine the nature and underlying cause of an error condition and to suggest an appropriate solution thereto. Manual procedures for such diagnostics involve a human reviewing such a plurality of diagnostic procedures based upon their observation of the nature of problem. The user chooses a first option from such a plurality of diagnostic procedures and based upon the results of performing this procedure determines whether other procedures are necessary and appropriate. The process then continues in an iterative manner until the error condition is eventually resolved.

In general, the device in which an error condition has been sensed is referred to herein as a managed device. A management device is a device coupled to the managed device on which a management client process interacts with a user to help resolve the recognized error condition. It is also generally known that such a management client process interfaces with a user to direct diagnostic procedures in conjunction with a corresponding management server operable within the managed device.

The managed device may be, for example, another computer system in which an error condition requires further diagnosis or may be any of a variety of devices including computer peripheral storage subsystems such as disk array storage systems.

It is generally known in such computing systems to provide automated assistance to a user in performing such diagnostic error recovery procedures. Presently known automated systems are generally one of two types. Help systems provide suggestions and prompts in response to user input describing the nature and symptoms of the error condition. Exemplary of such help systems are the help systems associated with personal computing products such as Microsoft Windows and Microsoft Office. The user enters a textual explanation of the problem including one or more keywords identifying the nature and symptoms of the problem. The help system searches its database for potentially relevant information and presents a list of such potentially relevant information to the user. The user then selects from the list information that appears to be most relevant and attempts to correct in the problem using recovery procedures in the supplied information. If the supplied information successfully corrects the error condition, the user proceeds with normal operation. If not, the user may select another recovery procedure from the list of potentially relevant information in hopes of further diagnosing and resolving the identified problem.

A second type of automated diagnosis system adds some degree of artificial intelligence or expert knowledge processing to help the user identify the most likely relevant recovery procedures from its database of potential diagnostic information. Such systems are often referred to as knowledge bases as distinct from mere databases. Such "intelligent" systems utilize a number of heuristic techniques and artificial intelligence techniques in an attempt to determine more accurately the nature of the problem from the user's description and to thereby refine the list of potential diagnostic procedures to those most likely to resolve the user's problem.

A first problem with all such presently known systems arises in the need for manual user interaction in describing the nature of the problem. Such manual procedures are prone to error both in terms of mis-characterizing the nature of the problem as well as mis-understanding detailed technical aspects of the problem. Present help systems and knowledge bases generally rely on the user to provide input (often in response to prompts from the help system) to describe the nature of the problem to be resolved. Such human input may misrepresent the nature of the error condition because the user fails to recognize the existence of or significance of particular aspects of the error.

A second problem with current help or diagnosis systems arises from their static nature. The databases or knowledge bases searched by present help or diagnosis systems generally are static in nature in that they are not dynamically adapted to particular states of the system being diagnosed. A recovery procedure for a particular error condition may be useful in one state of the managed device but less useful in another state of the managed device with the same error condition.

In view of the above discussion, it is evident that a need exists for improved management systems that provide additional automation to reduce human error in diagnosing error conditions. It is further desirable that improved management systems include a dynamic aspect to adapt their operation to the dynamic status of the managed device to be diagnosed.

SUMMARY OF THE INVENTION

The present invention solves the above and other problems, thereby advancing the state of the useful arts, by providing improved methods and systems for diagnosing problems in a managed device. In particular, a management client is operable to interact with the user and with a management server. The management server is operable within the managed device. The management server is operable to detect the present status of the managed device and to therefrom compute which recovery procedures are most likely to resolve the presently recognized problem in the managed device. Specifically, the server calculates a probability value associated with each possible recovery procedure. A list of recovery procedures is supplied to the user's management client. A user then selects a recovery procedure to be performed from the listed recovery procedures with associated computed probability indices in hopes of resolving the detected error condition. A feedback mechanism provides feedback to the management server such that subsequent calculations to select recovery procedures will recognize success or failure (or partial success or failure) of the performed recovery procedure as applied to the present status and error condition of the managed device.

A first aspect of the present invention is therefore its application of probabilistic or "fuzzy" techniques to aid the user in diagnosing and resolving problems in a managed device.

A second aspect of the present invention is its use of dynamic information regarding the present status of the managed device for selecting among the plurality of recovery procedures. Further, this status information is applied within the managed device to determine probabilities associated with each known recovery procedure.

Still another aspect of the present invention is its use of a feedback loop to adapt future probabilistic computations in recognition of success or failure (or partial success or failure) of a particular selected recovery procedure as applied to a particular error condition in a particular state of the managed device.

It is therefore an object of the present invention to provide improved methods and associated systems for managing recovery procedures associated with a managed device.

It is another object of the present invention to provide methods and associated systems for resolving error conditions in a managed device using an iterative feedback loop process.

It is yet another object of the present invention to provide methods and associated systems for dynamically determining preferred recovery procedures for resolving error conditions in a managed device.

It is a further object of the present invention to provide methods and associated systems to apply probabilistic techniques to identify recovery procedures most likely to successfully recover from an error condition in a managed device.

It is still a further object of the present invention to provide methods and associated systems for a dynamically selecting preferred recovery procedures for resolution of a problem in a managed device by computing a probability of success for each of a plurality of recovery procedures.

The above and other objects, aspects, features, and advantages of the present invention will become apparent from the following detailed description and the attached drawings.

BRIEF DESCRIPTION OF THE DRAWINGS

FIG. 3 is a flowchart describing additional details of a calculation of a probability index value for each recovery procedure in accordance with the methods of FIG. 2.

DETAILED DESCRIPTION OF THE PREFERRED EMBODIMENTS

Figure 1:
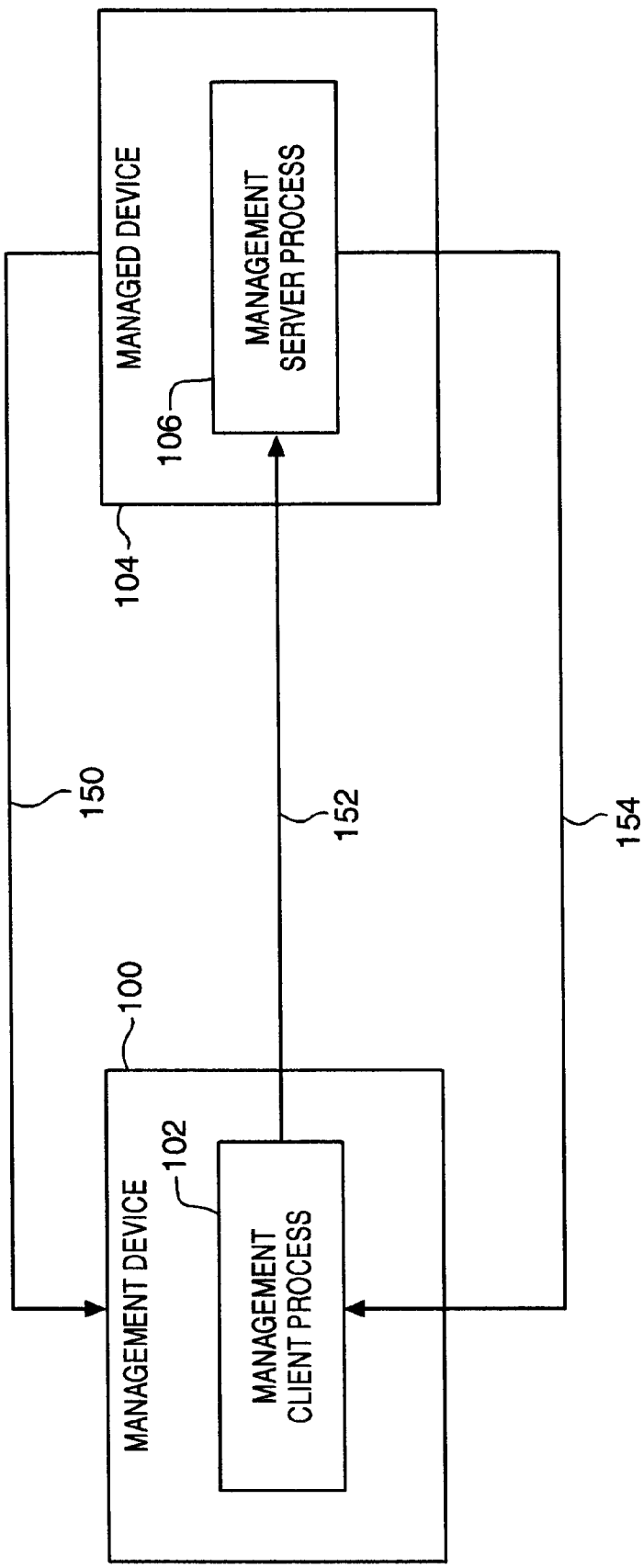
FIG. 1 is a schematic diagram of data flow between elements of a system of the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram describing the flow of data between a management device 100 and a corresponding managed device 104 in accordance with the present invention. Managed device 104 conveys information via path 150 to management device 100 indicative of the occurrence of one or more identified error conditions. Following generation and transmission of such an event identification, management server process 106 operable within managed device 104 generates a list of tuples of potential recovery procedures management client process 102 may select to attempt to resolve the error condition. Each tuple identifies the recovery procedure potentially useful in recovering from the identified error condition and includes an associated probability index value indicative of the probability that use of the procedure will in fact resolve the identified error condition. This list is generated and then transmitted from the management server process 106 to the management client process 102 via path 154.

As discussed further herein below, any of several well-known probabilistic computational techniques may be utilized to derive the probability index value. Key to the invention is the dynamic generation of such probability information based upon present status of the managed device and other information derived from within the managed device.

In response to receipt of such a list, management client process 102 is operable within management device 100 to select one of the recovery procedures identified in the list of tuples supplied by management server process 106. Any technique may be used to select from among the list of potential recovery procedures. In the preferred embodiment, a human operator would typically select the recovery procedure that indicates the highest probability of success in resolving the identified error condition. As noted further herein below, the selection may be performed manually by an operator or may be automatically selected by methods operable within the management device.

Next, the selected procedure is performed. Where the procedure is performed manually by the human operator, the operator indicates completion of the procedure to the management client process 102 which in turn conveys to the management server process 106 that the selected procedure has been performed. In alternative embodiments, certain recovery procedures may be performed automatically within the managed devices. For example, a recovery procedure may include resetting a bus or communication channel within the storage subsystem and restarting a failed operation. Where a selected procedure is to be automatically performed, management client process 102 conveys its selection of a particular recovery procedure via path 152 to management server process 106. Management server process 106 within managed device and 104 then performs the selected recovery procedure.

Whether performed manually or automatically, management server process 106 is informed of completion of the procedure so that the system may re-evaluate the present state. The client and server processes then communicate via path 150 to convey success, failure or partial success/failure in resolving the problem from performance of the selected recovery procedure.

In response to success of the selected recovery procedure, management client process 102 then continues normal operation in response to successful resolution of the error condition. In response to failure or partial success/failure, management client process 102 receives an updated list of possible procedures with updated probability index values.

The user and/or management client process 102 then selects another potential recovery procedure from the list of tuples previously supplied by management server process 106. The process continues in an iterative manner with management client process 102 requesting performance of other recovery procedures until one such procedure fully resolves the identified error condition. Each time a procedure fails to resolve the identified problem, management server process 106 within managed device 104 computes new probability index values for each possible recovery procedure.

Management client process 106 and management server process 102 therefore operate in combination as a feedback loop. The client process requests a particular recovery procedure be performed based upon probability values generated by the server process. Failure or partial success of the performed procedure causes the client to request another procedure be performed.

The probability values used by the client to select procedures are preferably computed in a manner to reflect a number of parameters including: the current state of the managed device, historical trends in prior use of each recovery procedure, predictive data regarding the system components, etc.

Figure 2:
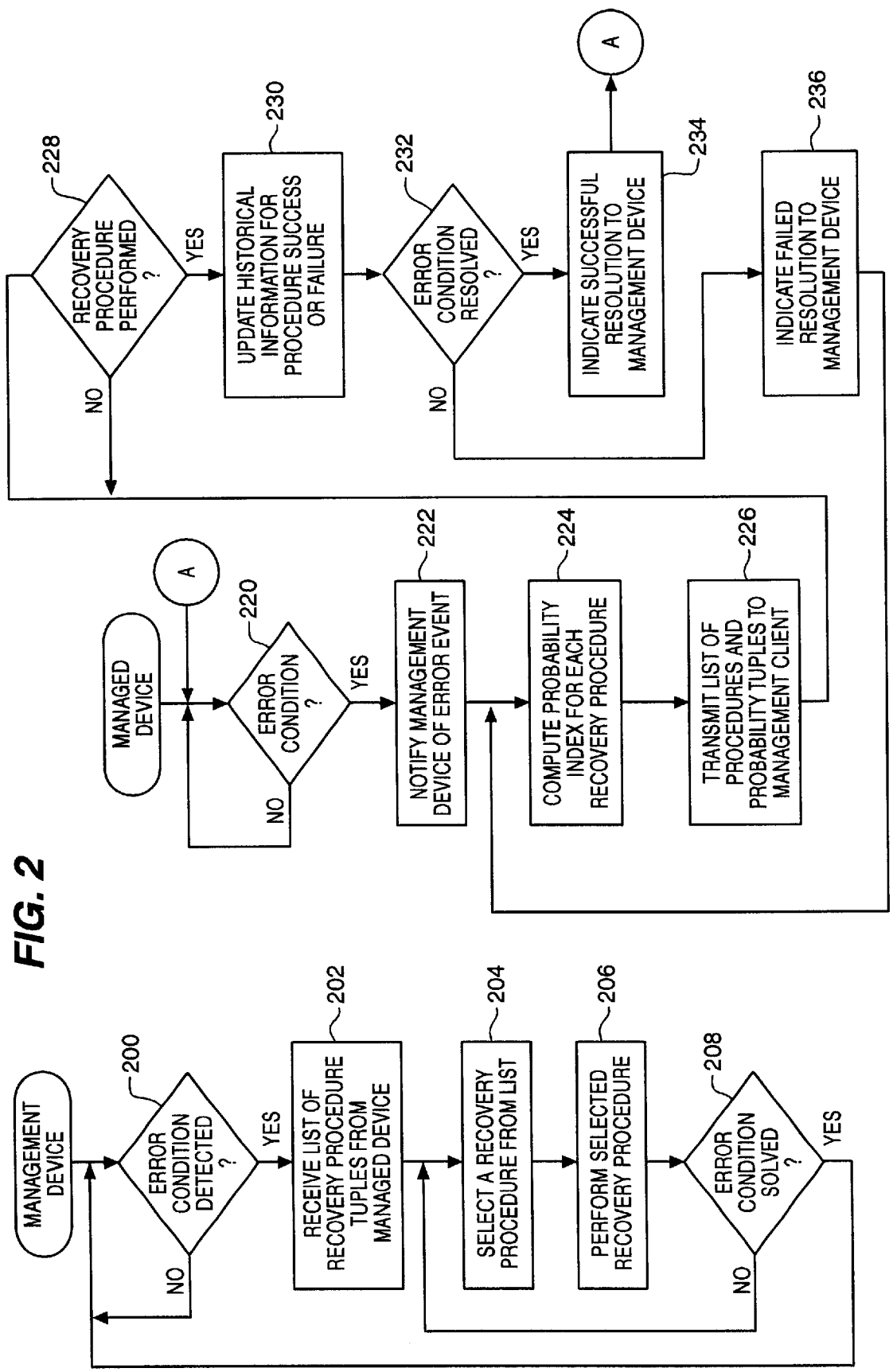
FIG. 2 is a flowchart describing methods of the present invention operable within the management device and managed device of FIG. 1.

FIG. 2 is a flow chart describing operation of methods of the present invention to dynamically select among the potential recovery procedures for resolution of an error condition using probabilistic feedback loop techniques. Elements 200 through 208 are operable within a management device 100 to direct error condition recovery with user interaction as required. Elements 220 through 236 are operable within the managed device 104 in cooperation with the methods of the management device to perform requested error recovery procedures in accordance with the probabilistic feedback techniques of the present invention.

Element 200 is first operable to determine within the management device whether an error condition has been detected as indicated by receipt of an appropriate error condition event from the managed device. If no such error condition event has been received, element 200 continues to loop awaiting receipt of such an event. When such error condition event is detected, element 202 is next operable to receive the list of recovery procedure tuples computed by, and transmitted from, the managed device. As noted above, each tuple includes an indicator of a particular recovery procedure and an associated, dynamically computed probability index value indicative of the probability of successful resolution of the present error condition by performance of the corresponding recovery procedure.

Element 204 is next operable to select one of the recovery procedures identified in the list of tuples. The selection processing of element 204 is typically a manual selection process performed by interaction with the user. In other words, the list of tuples identifying each potential recovery procedure and the probability index value associated therewith is presented to the user and the user indicates a selection through graphical or other input means. In the alternative, the management client process may automatically select a preferred procedure from the list.

In the preferred embodiment, whether performed manually or automatically, the recovery procedure that has not yet been performed having the highest probability of success is the next selected.

Element 206 is then operable to perform the selected recovery procedure. Performance of a recovery procedure may involve activities within the management device and activities within the managed device. The management device therefore requests the managed device to perform any operations required for performance of the selected recovery procedure. As noted above, performing a selected recovery procedure is typically a manual process wherein the operator replaces a suspect component in hopes of resolving the present error condition. Performance of a recovery procedure may therefore be a manual process, an automated process or a hybrid process involving both manual and automated steps.

Element 208 is then operable to determine whether the error condition has been resolved by performance of the selected recovery procedure. As noted above, methods of the present invention operable within the managed device return status to the management device indicating whether the recovery procedure just performed was successful in correcting the identified error condition or failed in so correcting the condition. If the error condition has been resolved, processing continues by looping back to element 200 to await an event indicative of yet another error condition. Otherwise, processing continues by looping back to element 204 to select another recovery procedure in an attempt to resolve the identified error condition.

Elements 204 through 208 are therefore operable in an iterative manner until the identified error condition has been resolved. Each iterative operation of element 204 preferably selects another recovery procedure. As noted above, in the preferred embodiment procedures are selected in order from highest probability of success through lowest probability of success as indicated by the corresponding probability index value for each recovery procedure.

Elements 220 through 236 are operable within the managed device in cooperation with the methods described above operable within the management device. Element 220 is first operable to await detection of an error condition within the managed device. When element 220 detects occurrence of an error condition within the managed device, element 222 is next operable to notify the management device of the occurrence of the detected error. An appropriate event message identifying the error condition is generated and transmitted to the management client operable within the management device.

Element 224 is next operable to calculate a probability index value for each recovery procedure known to the managed device. Additional detail of such computations is provided herein below with respect to FIG. 3. Element 226 is then operable to transmit a list of procedures to the management client process operable within the management device. As noted above, the entries of the list are tuples where each tuple identifies the recovery procedure and a corresponding probability index value indicative of the probability that the associated recovery procedure will correct the identified error condition. Element 228 is then operable to await receipt from the management device of a request to perform a particular selected recovery procedure. As noted above, the method operable within the management device selects a recovery procedure from the list of tuples supplied by the managed device. Following performance of the selected recovery procedure, element 230 is next operable to update a log (database) of historical information regarding success or failure of the selected recovery procedure as applied to the presently identified error condition. As discussed further herein below, such historical information is useful in the probabilistic calculations performed by element 224 above.

Element 232 is then operable to determine whether the just performed recovery procedure successfully resolved the presently identified error condition within the managed device. If the procedure was successful, element 234 is next operable to so indicate successful resolution of the error condition to the management device. Processing then continues by looping back to element 220 to await detection of another error condition within the managed device. If the recovery procedure just performed was unsuccessful in fully resolving the presently identified error condition, element 236 is next operable to so indicate to the management device the failure (or partial success/failure) of the procedure in resolving the error condition. Processing then continues by looping back to element 224 to recalculate the probability index values of possible recovery procedures and to await selection and performance of another recovery procedure selected by the user or management device.

Those skilled in the art will recognize that the above description of two distinct processes (a management client and a management server) is but a single exemplary embodiment of the present invention. A wide variety of alternate design choices may be adopted by those skilled in the art to implement the desired structure and function. In addition, the event/status message exchange model described above is but one exemplary embodiment of the invention. Again, those skilled in the art will recognize a wide variety of alternate design choices which may be adopted to implement the invention.

FIG. 3 is a flow chart describing additional details of the operation of element 224 to calculate a probability index value for each recovery procedure. Those skilled in the art will recognize that a wide variety of probabilistic and statistical models and calculations may be used in determining be probability index value for successful resolution of an error condition by each of the known recovery procedures. FIG. 3 is therefore intended merely to suggest some of the common factors that may be useful in calculating a probability of success for each recovery procedure.

Element 300 is first operable to determine the probability of success for each known recovery procedure for the presently identified error condition. Certain procedures may be known to be relevant or irrelevant to resolution of the particular, presently identified error condition. Element 300 is therefore operable to determine the effect of the presently identified error condition on calculation of the probability index value for each recovery procedure.

Element 302 is then operable to factor into each probability index value the effect of the present state of the managed device. Certain procedures may be known to be more or less effective in resolving a particular identified error condition based upon the present state of the managed device. Element 302 therefore factors this consideration into the computation of each probability index value.

Element 304 is then the operable to factor into each probability index value the effect of historical information gathered from prior performances of each recovery procedure. As a recovery procedure is selected and performed the success or failure of each performance for each particular identified error condition is recorded in a historical information log or database. Element 304 is therefore operable to factor this historical information into the calculation of each probability index value.

Those skilled in the art will recognize a wide variety of other factors that may be included in the probabilistic calculations to determine probability index value for each recovery procedure. Further, FIG. 3 depicts these exemplary factors as three distinct computational steps merely for discussion purposes and clarity. Those skilled in the art will recognize that the calculations may be as easily performed in a single simpler calculation step.

Understanding of the present invention is furthered by the following exemplary application of the invention. A "classic" error recovery scenario is a multiple drive failure in a storage system. The failure may appear as an instantaneous "snapshot" showing the present failure state of multiple disk drives in the storage system. Such a situation may arise from a number of exemplary causes:

1. Each drive may have failed at a different time and independent of one another.
2. The communication channel(s) that may be common to the failed drives may have failed.
3. The controller's channel interface chip/device may have failed.
4. The enclosure containing the failed drives may have failed.
5. Any combination of the above failure may have occurred.

Preferred recovery procedures will vary depending on which of these exemplary failure modes has really occurred. The controller may initially apply heuristic rules to the particular failure to determine which failure is most likely. For example, if the failed drives are housed in a common enclosure or connected via common communication channels, those procedures well adapted to such problems may be preferred in the initial probability determination. Conversely, if the failed drives are randomly distributed through multiple enclosures or across multiple communication channels, then it may be better to presume independent failures of each of the drives per se. The controller may also have a historical record of a time sequence of failures that led to this state to aid in initially prioritizing the preferred recovery procedures.

Having thus determined the initial probabilities for the various recovery procedures, the list of such tuples is conveyed to a client process or user. The operator would typically select the highest priority recovery procedure and manually perform it. If an error condition remained following performance of the selected procedure, the controller would recompute a new set of probabilities for the possible recovery procedures. The recalculation would now account for the knowledge that the earlier performed recovery procedure failed to fully resolve the error condition.

For example, if the multiple drive failure scenario noted above initially suggested that an enclosure monitoring card was the source of the problem, its replacement would have been the highest probability recovery procedure in the initial calculation of probabilities. Failure of replacement of the enclosure monitoring card to resolve the error condition might then suggest that the communication channel or communication channel interface circuit(s) are the likely cause of the problems. Updated probability calculations would then emphasize the higher probability of these recovery procedures. If the replacement or repair of communication channel related components still didn't resolve the problem, further updating of the probabilities would reveal that replacement of the disk drives themselves would offer the highest probability for resolution of the error condition. Historical information within the managed device that one drive failed earlier than the others might suggest that the first drive failure was a "true" drive failure while the others might have been controller, communication or enclosure related.

The recovery procedure probability calculations could also account for improving the potential for retaining user data. Therefore, procedures that require changing of drives on which user data is stored could be prioritized with a lower probability than other options that may be first attempted in hopes of preserving the user data.

Further, the probability calculations could utilize historical trend data and predictive data based on usage of the components in the system to adapt the calculations to the present and past state of the system.

In sum, as noted, the controller of the present invention would make a first "educated guess" as to the preferred recovery procedure based upon a knowledge base or other information store. The controller would then refine its "guesses" based on a number of factors as exemplified above and assign new probability index values to each possible recovery procedure. This process continues in an iterative manner until the problem is resolved or no further recovery procedures are known to the system.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. An error condition recovery method for a managed device comprising the steps of:
   (a) reporting an error condition to a management device coupled to said managed device;
   (b) generating a list of recovery procedures wherein each entry in said list includes indicia of a recovery procedure and an associated probability of success for the associated recovery procedure to resolve said error condition;
   (c) returning said list to said management device;
   (d) performing a recovery procedure from said list in response to a request by said management device; and
   (e) updating said probability associated with each recovery procedure in response to performance of said recovery procedure.

2. The method of claim 1 wherein the step of generating includes the step of:
   calculating said associated probability of success for each said recovery procedure in said list.

3. The method of claim 2 wherein the step of calculating includes the step of:
   calculating said associated probability of success as a function of a present status of said managed device.

4. The method of claim 1 further comprising the step of:
   retaining historical information regarding success and failure of each said recovery procedure for correcting said error condition.

5. The method of claim 4 wherein the step of generating includes the step of:
   calculating said associated probability of success for each said recovery procedure in said list.

6. The method of claim 5 wherein the step of calculating includes the step of:
   calculating said associated probability of success as a function of said historical information.

7. The method of claim 4 wherein the step of updating includes the step of:
   calculating said associated probability of success as a function of said historical information.

8. The method of claim 1 further comprising the step of:
   repeating steps (b) through (e) until said error condition is resolved.

9. The method of claim 1 wherein the step of performing comprises:
   performing said recovery procedure automatically within said managed device.

10. The method of claim 1 wherein the step of performing comprises:
    manually performing said recovery procedure by human intervention with said managed device.

11. In a system including a management device and a managed device, a method for resolving error conditions in said managed device comprising the steps of:
    recognizing an error condition within said managed device;
    (a) determining, within said managed device, a probability index for each of a plurality of recovery procedures wherein said probability index is indicative of the likelihood of an associated recovery procedure to correct said error condition;
    (b) selecting a recovery procedure from said plurality of recovery procedures based up said probability index associated with each said recovery procedure;
    (c) performing a recovery procedure selected from said plurality of recovery procedures; and
    repeating steps (a) and (c) until said error condition is resolved.

12. The method of claim 11 wherein the step of performing includes the step of:
    maintaining historical information regarding success and failure of each said recovery procedure performed.

13. The method of claim 12 wherein the step of determining includes the step of:
    calculating said probability index as a function of said historical information.

14. The method of claim 11 wherein the step of determining includes the step of:
    calculating said probability index as a function of a present status of said managed device.

15. The method of claim 11
    wherein the step of selecting comprises selecting said recovery procedure automatically within said managed device; and
    wherein the step of performing comprises performing said recovery procedure automatically within said managed device.

16. The method of claim 11
    wherein the step of selecting comprises manually selecting said recovery procedure by human intervention with said managed device; and
    wherein the step of performing comprises manually performing said recovery procedure by human intervention with said managed device.

17. The method of claim 1, wherein the error condition is a communication channel failure, an interface failure, or an enclosure failure.

18. The method of claim 1, wherein the step of performing a recovery procedure from said list includes performing an error recovery procedure having a lower probability of success than another available error recovery procedure from said list.

19. The method of claim 4, wherein the historical information includes trend data.

20. The method of claim 4, wherein the historical information includes predictive data regarding system components.

* * * * *